(12) United States Patent
Fonser et al.

(10) Patent No.: US 10,710,101 B2
(45) Date of Patent: Jul. 14, 2020

(54) CENTRIFUGAL SEPARATOR HAVING A VORTEX GENERATOR

(71) Applicant: ALFA LAVAL CORPORATE AB, Lund (SE)

(72) Inventors: Per Fonser, Enskededalen (SE); Peter Hagqvist, Stockholm (SE); Lars Hillström, Uppsala (SE); Carl Häggmark, Täby (SE); Roland Isaksson, Grödinge (SE); Tom Manelius, Mariefred (SE); Jan Skoog, Skogås (SE); Peter Thorwid, Sundbyberg (SE); Olle Törnblom, Tullinge (SE); Martin Hansson, Bandhagen (SE)

(73) Assignee: ALFA LAVAL CORPORATE AB, Lund (SE)

( * ) Notice: Subject to any disclaimer, the term of this patent is extended or adjusted under 35 U.S.C. 154(b) by 1021 days.

(21) Appl. No.: 14/439,513

(22) PCT Filed: Nov. 19, 2013

(86) PCT No.: PCT/EP2013/074146
§ 371 (c)(1),
(2) Date: Apr. 29, 2015

(87) PCT Pub. No.: WO2014/079832
PCT Pub. Date: May 30, 2014

(65) Prior Publication Data
US 2015/0298142 A1   Oct. 22, 2015

(30) Foreign Application Priority Data
Nov. 23, 2012 (EP) .................................. 12194053

(51) Int. Cl.
*B04B 5/12* (2006.01)
*B01D 45/14* (2006.01)
(Continued)

(52) U.S. Cl.
CPC ............... *B04B 5/12* (2013.01); *B01D 45/14* (2013.01); *B04B 5/08* (2013.01); *B04B 7/02* (2013.01);
(Continued)

(58) Field of Classification Search
CPC .. B01D 45/14; B04B 5/12; B04B 5/08; B04B 7/02; B04B 7/12; B04B 7/14;
(Continued)

(56) References Cited

U.S. PATENT DOCUMENTS 1,906,457 A * 5/1933 Flowers .................. B04B 11/06
                                                  494/66
3,273,325 A   9/1966 Gerhold et al.
(Continued)

FOREIGN PATENT DOCUMENTS

CN   2057696 U   5/1990
CN   1675453 A   9/2005
(Continued)

OTHER PUBLICATIONS

U.S. Appl. No. 14/439,592, filed Apr. 29, 2015.

*Primary Examiner* — Charles Cooley
(74) *Attorney, Agent, or Firm* — Birch, Stewart, Kolasch & Birch, LLP

(57) ABSTRACT

A centrifugal separator and a method for separation of particles from a gas stream is disclosed. The separator includes a frame, a gas inlet and a gas outlet. A centrifugal rotor is arranged to be rotatable in the frame around a rotational axis and includes a plurality of separation plates defining separation passages between the plates. A central
(Continued)

gas chamber in the rotor communicates with a radially inner portion of the separation passages and the gas outlet. A space surrounding the rotor communicates with a radially outer portion of the separation passages and the gas inlet. A device is configured to bring the gas stream in rotation upstream of the rotor. The centrifugal rotor is configured such that the rotational flow of the gas mixture drives the rotation of the centrifugal rotor for separating particles from the same gas stream being conducted from the space surrounding the rotor, through the separation passages between the plates and towards the central gas chamber.

18 Claims, 4 Drawing Sheets

(51) Int. Cl.
  *B04B 9/06* (2006.01)
  *B04B 11/02* (2006.01)
  *B04B 7/02* (2006.01)
  *B04B 5/08* (2006.01)
  *B04B 7/12* (2006.01)
  *B04C 9/00* (2006.01)

(52) U.S. Cl.
  CPC .............. *B04B 7/12* (2013.01); *B04B 9/06* (2013.01); *B04B 11/02* (2013.01); *B04B 2005/125* (2013.01); *B04C 2009/007* (2013.01)

(58) Field of Classification Search
  CPC .. B04B 11/02; B04B 9/06; B04B 9/12; B04B 2005/125; B04B 13/00; B04C 2009/007
  USPC ...................................... 494/24, 74
  See application file for complete search history.

(56) References Cited

U.S. PATENT DOCUMENTS

| | | | | |
|---|---|---|---|---|
| 3,557,537 | A * | 1/1971 | Roberts | F02C 7/052 415/121.2 |
| 4,173,458 | A * | 11/1979 | Stiles | B01D 45/14 55/405 |
| 4,363,641 | A | 12/1982 | Finn, III | |
| 4,448,688 | A * | 5/1984 | Havlis | B04B 9/06 |
| 4,687,585 | A | 8/1987 | Ramshaw | |
| 4,994,097 | A | 2/1991 | Brouwers | |
| 5,536,289 | A | 7/1996 | Spies et al. | |
| 5,599,365 | A | 2/1997 | Alday et al. | |
| 5,755,096 | A | 5/1998 | Holleyman | |
| 6,264,712 | B1 * | 7/2001 | Decker | B01D 45/14 55/445 |
| 6,358,415 | B1 | 3/2002 | Leung | |
| 6,592,654 | B2 | 7/2003 | Brown | |
| 6,669,843 | B2 * | 12/2003 | Arnaud | B01D 21/2433 210/188 |
| 6,755,897 | B2 | 6/2004 | Daly | |
| 6,925,993 | B1 * | 8/2005 | Eliasson | B01D 45/16 123/572 |
| 7,163,626 | B1 | 1/2007 | Cuypers et al. | |
| 7,550,032 | B2 | 6/2009 | Brouwers et al. | |
| 8,152,905 | B2 | 4/2012 | Tuomas | |
| 8,328,709 | B2 * | 12/2012 | Bech | B01D 17/0217 494/49 |
| 9,884,327 | B2 * | 2/2018 | Fonser | B01D 45/14 |
| 2001/0012814 | A1 * | 8/2001 | May | B04B 5/005 494/24 |
| 2003/0233932 | A1 | 12/2003 | Ekeroth | |
| 2004/0040442 | A1 * | 3/2004 | Franzen | B01D 45/14 95/270 |
| 2004/0214710 | A1 * | 10/2004 | Herman | B04B 5/005 494/36 |
| 2007/0163215 | A1 * | 7/2007 | Lagerstadt | B04B 5/12 55/406 |
| 2008/0006011 | A1 | 1/2008 | Larnholm et al. | |
| 2008/0009402 | A1 * | 1/2008 | Kane | B01D 45/14 494/53 |
| 2008/0256912 | A1 | 10/2008 | Kup et al. | |
| 2009/0025562 | A1 * | 1/2009 | Hallgren | B01D 45/14 96/216 |
| 2009/0084714 | A1 | 4/2009 | Schook | |
| 2009/0131236 | A1 * | 5/2009 | Bech | B01D 17/0217 494/5 |
| 2009/0266231 | A1 | 10/2009 | Franzen et al. | |
| 2010/0011961 | A1 * | 1/2010 | Poorte | B01D 19/0036 96/215 |
| 2010/0107687 | A1 | 5/2010 | Andrian et al. | |
| 2011/0132192 | A1 * | 6/2011 | Bates | B01D 45/14 95/28 |
| 2011/0237417 | A1 * | 9/2011 | Rudman | B04B 1/08 494/70 |
| 2012/0031270 | A1 * | 2/2012 | Carlsoon | B01D 45/14 95/270 |
| 2015/0290660 | A1 * | 10/2015 | Fonser | B01D 45/14 494/74 |
| 2015/0298142 | A1 * | 10/2015 | Fonser | B01D 45/14 494/24 |
| 2017/0173596 | A1 * | 6/2017 | Fonser | B04B 5/12 |
| 2017/0312760 | A1 * | 11/2017 | Eliasson | B04B 5/12 |

FOREIGN PATENT DOCUMENTS

| | | | |
|---|---|---|---|
| CN | 101171087 A | 4/2008 | |
| CN | 101189414 A | 5/2008 | |
| CN | 101203319 A | 6/2008 | |
| CN | 101766936 A | 7/2010 | |
| CN | 201701823 U | 1/2011 | |
| DE | 42 01 066 C1 | 7/1993 | |
| DE | 103 00 976 A1 | 7/2003 | |
| EP | 1 848 523 B1 | 5/2010 | |
| GB | 1 233 347 A | 5/1971 | |
| GB | 2401331 A * | 11/2004 | ............ B04B 5/005 |
| NO | 20053362 A | 1/2007 | |
| SE | 532 661 C2 | 3/2010 | |
| SU | 662124 A1 | 5/1979 | |
| SU | 929232 | 5/1982 | |
| SU | 1165436 A2 | 7/1985 | |
| WO | WO 02/44530 A1 | 6/2002 | |
| WO | WO 2007/011233 A1 | 1/2007 | |
| WO | WO 2007/128778 A1 | 11/2007 | |
| WO | WO 2008/082291 A1 | 7/2008 | |
| WO | WO 2008/111909 A1 | 9/2008 | |
| WO | WO 2010/090578 A1 | 8/2010 | |
| WO | WO 2011/129697 A1 | 10/2011 | |

* cited by examiner

CENTRIFUGAL SEPARATOR HAVING A VORTEX GENERATOR

TECHNICAL FIELD

The present invention relates generally to a centrifugal separator and a method for separation of particles from a gas stream.

BACKGROUND

WO 2010/090578 A1 discloses a centrifugal separator plant for separating oil in form of particles and/or mist from a fossil gas mixture for obtaining a separated gas. The plant comprises a centrifugal separator with a stationary casing defining a separation space. The centrifugal separator comprises an inlet for the gas mixture, a gas outlet for the separated gas and an oil outlet for discharging separated oil. A separating member for separating the gas mixture comprises a plurality of separating discs and is provided in the separation space. A drive motor is connected to the separating member via a spindle and rotates the separating member about an axis of rotation.

SUMMARY

An object of the present invention is to simplify the construction and operation of a centrifugal separator for separation of particles from a gas stream, such as the type of centrifugal separator disclosed in the background art. Another object is to reduce the cost of this type of centrifugal separator. It is also an object to reduce the pressure drop over the centrifugal separator.

Thus the present invention relates to a centrifugal separator for separation of particles from a gas stream. Particles are defined as solid and/or liquid particles, such as oil droplets or oil mist. The centrifugal separator comprises a frame, a gas inlet and a gas outlet. A centrifugal rotor is arranged to be rotatable in the frame around a rotational axis and comprises a plurality of separation plates, such as frustoconical separation discs or axial plates, defining separation passages between the plates. A central gas chamber is formed in the rotor and communicates with a radially inner portion of the separation passages and the gas outlet. A space surrounding the rotor communicates with a radially outer portion of the separation passages and the gas inlet. The centrifugal separator further comprises a vortex generator configured to bring the gas stream in rotation upstream of the rotor, and the centrifugal rotor is further configured such that the rotational flow of the gas mixture drives the rotation of the centrifugal rotor for separating particles from the same gas stream being conducted from the space surrounding the rotor, through the separation passages between the plates and towards the central gas chamber.

Thus the centrifugal rotor is brought into rotation by the rotational flow of the gas stream, whereby the centrifugal separator may be independent on a separate drive motor to drive the rotor. Thereby the construction of the separator may be simplified, the cost may be reduced and the need for service and maintenance of the separator may be decreased. Since the rotor is driven in rotation by the rotational flow of the gas, the rotational speed of the rotor is similar to the rotational speed of the gas entering into the separation passages. This is particularly beneficial since it reduces the pressure drop over the separator. Further, since the rotating gas stream is led from the radially outer portions of the separation passages and towards the radially inner portions of the separation passages, the gas stream is spun up thanks to the conservation of angular momentum. Thus the transfer of the rotation from the gas to the rotor, such as by viscous forces, is particularly efficient. The centrifugal rotor may preferably be configured such that the rotational flow of the gas mixture alone drives the rotation of the centrifugal rotor for separating particles from the same gas stream, whereby the centrifugal rotor is not driven by a motor connected to the rotor.

The vortex generator configured to bring the gas stream in rotation may preferably be disengaged from the rotor, such that the rotor may rotate independently of the vortex generator configured to bring the gas stream in rotation.

The vortex generator configured to bring the gas stream in rotation may be stationary or at least non-rotating during operation of the apparatus. The vortex generator configured to bring the gas stream in rotation may comprise a gas deflecting ring connected to the frame, configured to bring the gas stream in rotation by deflecting the gas stream towards a tangential direction of the centrifugal rotor. The gas deflecting ring may comprise at least one, preferably a plurality of vanes inclined with respect to the axial direction of the centrifugal rotor and distributed around the rotational axis. The vanes may preferably be arranged at a large radius of the centrifugal separator with respect to the rotational axis, such extending radially outside the separation plates of the rotor or at a radial position close to or radially outside the radially outer portions of the separation passages. Thus a pre-separation of particles from the gas stream may be performed in the rotating gas in the space radially outside the separation plates. The inclination of the vanes with respect to the axial direction of the centrifugal rotor may increase gradually along the extent of the vanes in the direction of the flow of the gas stream from the gas inlet to the gas outlet to provide smooth acceleration of the gas stream into rotation. Thus the rotational flow of the gas stream may be provided efficiently by a robust and uncomplicated construction which may be fitted close to the rotor and provided in line with the centrifugal rotor and which makes use of the momentum of the gas stream to provide the rotational flow.

The inclination of the vanes with respect to the axial direction of the centrifugal rotor may be adjusted during operation of the separator such that to control the rotational speed of the gas stream. Thus the rotation of the centrifugal rotor may be controlled by adjusting the inclination of the vanes. In particular, the rotational speed of the rotor may be limited by limiting the rotational speed of the gas stream in the vessel.

The gas inlet may be arranged at an angle to the rotational axis of the centrifugal rotor, wherein the angle is within the range of 70-110 degrees, preferably 80-100 degrees, more preferably 90 degrees, and wherein the vortex generator configured to bring the gas stream in rotation upstream of the rotor comprises an inlet gas deflecting member which is arranged to deflect the gas stream from the gas inlet towards a tangential direction of the centrifugal rotor. Thus the rotational flow of the gas stream may be provided while connecting the gas inlet at an angle close to 90 degrees to the vessel wherein the centrifugal separator is arranged. Thereby the connection may be configured to withstand high pressure in the vessel, while the inlet gas deflecting member causes the rotational flow of the gas stream.

The gas inlet may alternatively be arranged in line with the rotational axis of the centrifugal rotor, and the vortex generator configured to bring the gas stream in rotation upstream of the rotor may comprise an inlet gas deflecting member which is arranged to deflect the gas stream from a direction along the rotational axis towards a tangential direction of the centrifugal rotor.

The inlet gas deflecting member may be arranged upstream of the gas deflecting ring, to provide a pre-separation of particles from the gas stream such that in the form of a cyclonic separator.

The position or inclination of the inlet gas deflecting member may be adjusted during operation of the separator such that to control the rotational speed of the gas stream. Thus the rotation of the centrifugal rotor may be controlled by adjusting the inclination of the inlet gas deflecting member.

The vortex generator configured to bring the gas stream in rotation may comprise a rotating fan arranged upstream of the rotor.

The rotor may have a first and a second axial end portion, and the rotor may be rotatably supported in the frame by means of a first bearing at the first axial end portion and a second bearing at the second axial end portion. Thus a more stable rotor construction may be achieved.

The frame may be configured to be mountable inside a vessel for guiding the gas stream, and may comprise a first partition for dividing the vessel into a first section upstream of the first partition and a second section downstream of the first partition, wherein the gas inlet is communicating with first section, the gas outlet is communicating with second section, and wherein the centrifugal separator is configured such that the first and second sections communicate via the separation passages of the rotor. A seal may be provided between the first partition and the centrifugal rotor. The seal may be a gap sealing the form of a narrow passage. Thus the gas stream is forced into the separation passages when flowing from the first section to the second section.

The vessel may be configured to permit a pressure of at least 10 bars in the gas stream guided by the vessel. The centrifugal separator may comprise a portion of the vessel. In such a vessel the centrifugal separator is particularly beneficial since the separator may be operated inside the vessel without any major modifications to the vessel, such as electrical or mechanical components or connectors led through the vessel wall.

The frame may be a self-supporting frame for mounting inside an existing vessel for guiding the gas stream, and wherein the frame comprising a holding means to hold the frame at a position inside the vessel. Thus the centrifugal separator may be fitted in existing vessel systems, such as pipelines for transporting gas or air ducts and the like. This is beneficial since the vessel system does not need to be reconstructed for mounting the centrifugal separator, and the vessel system may be maintained and optimized to withstand high pressures and/or the installation may be simplified. The frame may be configured to be releasably mountable in an existing vessel for guiding the gas stream.

The frame may comprise a passage upstream of the rotor, wherein the vortex generator configured to bring the gas stream in rotation is arranged in the passage. A flow directing element may be provided upstream of the passage to direct the gas stream into the passage. Thus the flow of the gas stream may be efficiently forced into the vortex generator configured to bring the gas stream in rotation.

The plurality of separation plates may comprise a stack of frustoconical separation discs provided at mutual distances from one another, defining the separation passages between the discs and wherein each separation disc is provided with distance members extending from a radially inner portion of the separation disc to a radially outer portion of the separation disc to define the separation passages between the discs of the stack of frustoconical separation discs. Thus the rotation of the gas stream may efficiently be transferred to a rotation of the rotor upon spinning up of the rotating gas in the separation passages. The distance members may increase the efficiency by providing a function as vanes transferring rotational momentum from the gas to the rotor. The distance members may alternatively or additionally comprise distance members in the form of dot-shaped caulks or micro-caulks, distributed over the surface of the separation discs.

The separation plates may be formed in polymeric material or in metal, such as stainless steel.

The centrifugal separator may be configured to provide the rotor with a rotational speed in the range of 100-11000 rpm, preferably 1000-3000 rpm, during operation of the device and driven by the rotational flow of the gas stream. The separation is efficient even at relatively low rotational speeds.

The invention further relates to a method of separating particles from a gas stream, the method comprising providing a centrifugal rotor arranged to be rotatable around a rotational axis and comprising a plurality of separation plates defining separation passages between the plates, a central gas chamber in the rotor communicating with a radially inner portion of the separation passages and the gas outlet, a space surrounding the rotor and communicating with a radially outer portion of the separation passages and the gas inlet, bringing a gas stream in rotation upstream of the rotor, and rotating the rotor by the rotational flow of the gas stream for separating particles from the gas stream.

The gas stream may be a stream of fossil gas, natural gas, biogas, exhaust gas, ventilation gas, crankcase gas, carbon dioxide ($CO_2$), hydrogen sulfide ($H_2S$), etc.

The invention further relates to the use of a centrifugal separator as disclosed for separation of particles, such as solid or liquid particles from a stream of gas, such as a stream of fossil gas, natural gas, biogas, exhaust gas, ventilation gas, crankcase gas, carbon dioxide ($CO_2$), hydrogen sulfide ($H_2S$), etc, and/or applied to positions in gas compression, amine processes, Shell Claus off-gas treating (SCOT) processes, in exhaust gas scrubbing and the like.

The invention further relates to the use of a centrifugal separator as disclosed for separation of particles, such as solid or liquid particles from a stream of gas in a pressure vessel, which vessel may be configured to permit a pressure of at least 10 bars in the gas stream guided by the vessel.

BRIEF DESCRIPTION OF DRAWINGS

The invention is now described, by way of example, with reference to the accompanying drawings, in which.

DESCRIPTION OF EMBODIMENTS

Figure 1:
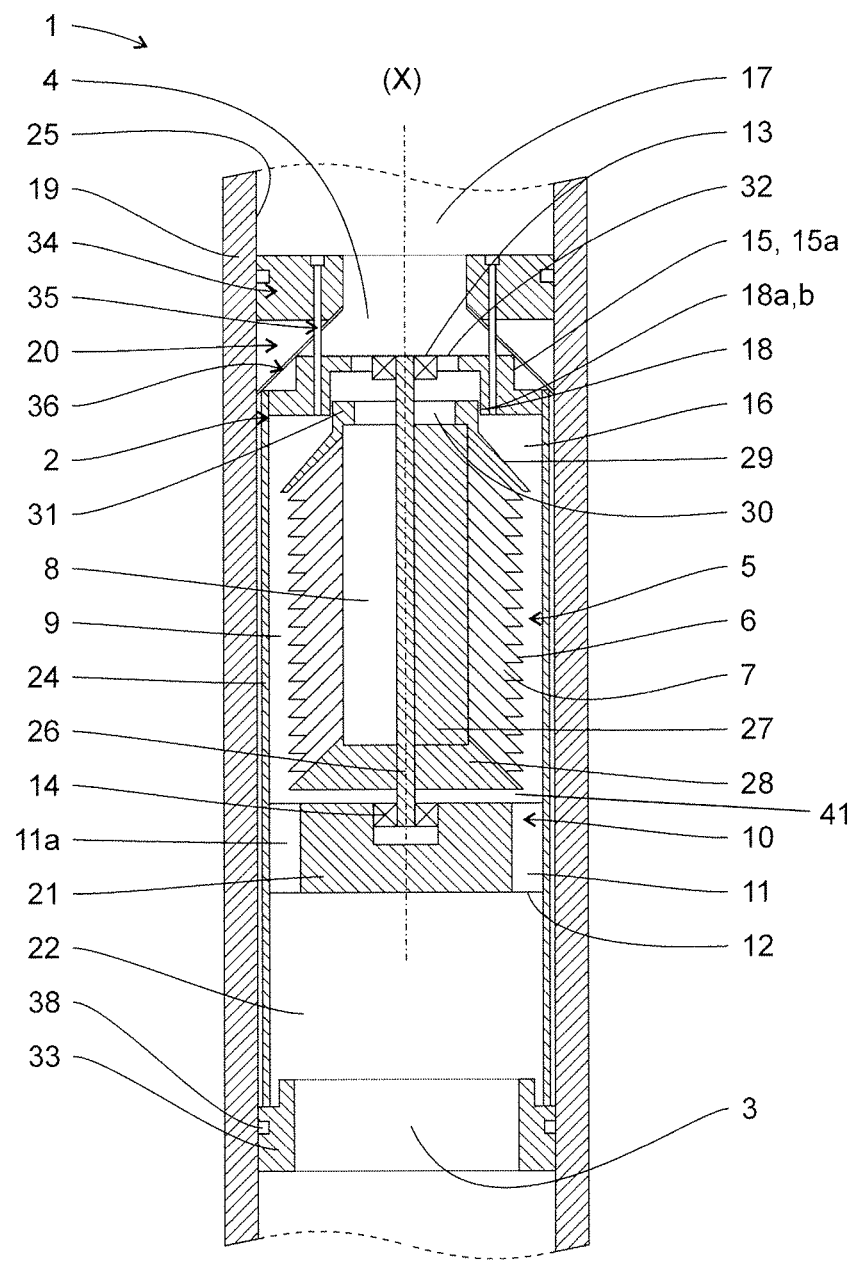
FIG. 1 shows a cross-section along the rotational axis of a centrifugal separator according to the invention, arranged in a cylindrical vessel for conveying a gas stream.

In FIG. 1 a centrifugal separator 1 for separation of particles from a gas stream is shown arranged in a cylindrical vessel 19 in the form of a cylindrical pipe for guiding the gas stream. The separator comprises a self-supporting frame 2 for mounting inside the vessel 19. Self-supporting is understood as an ability of the frame to support itself without relying on support from the vessel such as during mounting and dismounting. The frame is provided with a first partition 15 for dividing the vessel into a first section 16 upstream of the partition and a second section 17 downstream of the partition. The separator further comprises a gas inlet 3 communicating with the first section and a gas outlet 4 communicating with the second section.

Figure 2:
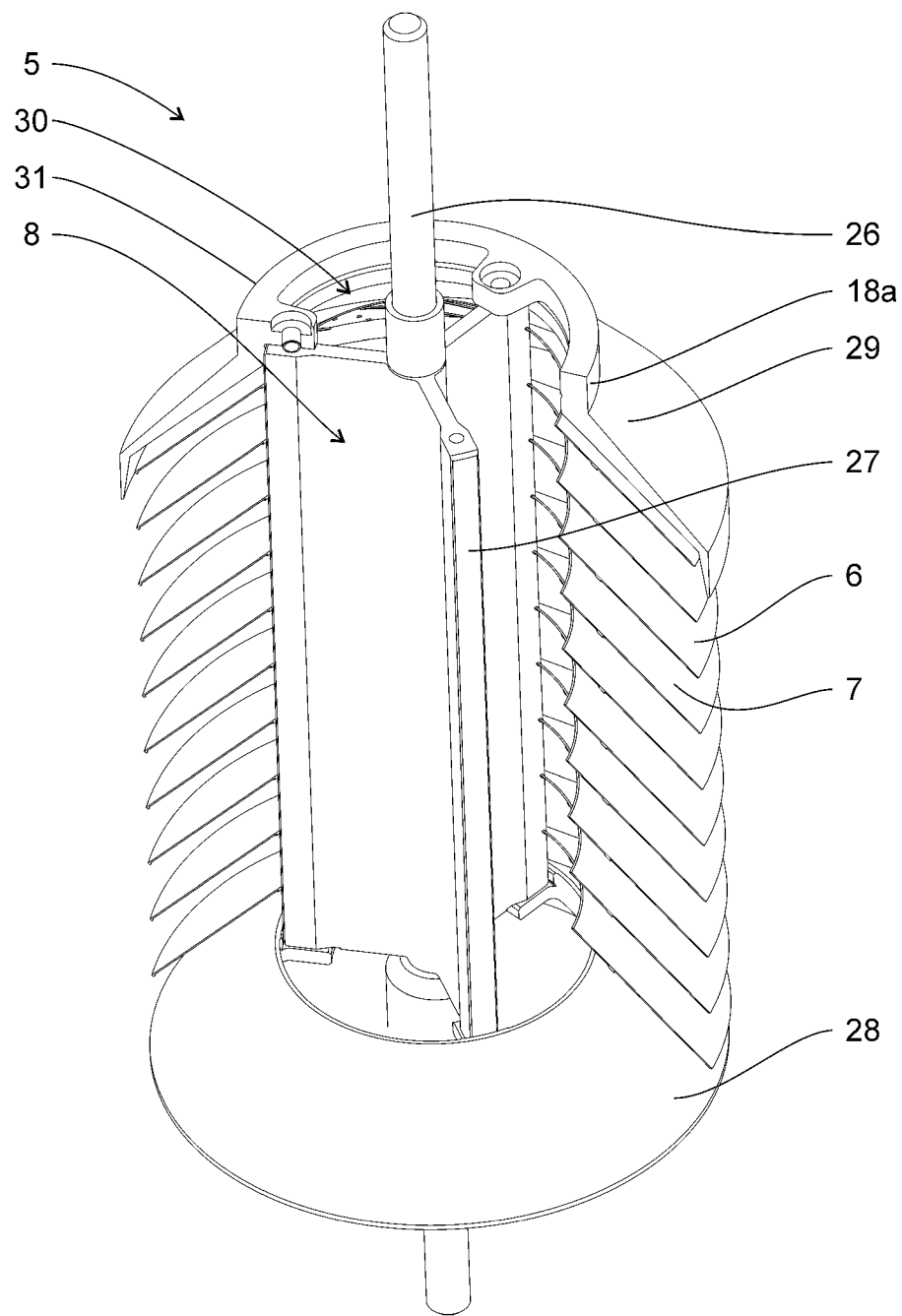
FIG. 2 shows a partially cut-out perspective view of a rotor of such a centrifugal separator.

The centrifugal separator further comprises a centrifugal rotor 5 arranged to be rotatable in the frame around a rotational axis x. The rotational axis extends in the direction of the extension of the vessel. The rotor comprises a shaft 26 having a first and a second end portion. The first end portion is supported in a first frame portion 15*a* by means of a first bearing 13. The first frame portion 15*a* comprises the first partition 15. The second end portion is supported in the frame by means of a second bearing 14 held in a second frame portion 21. With reference to FIG. 2, the rotor is described in more detail. The rotor comprises a disc support structure 27 connected to the rotor axis and extending between the first and second end portions of the rotor axis. The disc support structure has three plate like wings extending along the rotor axis and radially outwards from the rotor axis. In an alternative embodiment the disc support structure comprises two or more wings, such as six wings. Towards the second end portion of the rotor axis, a bottom disc 28 is attached to the wings of the disc support structure. On the bottom disc, and guided by the radially outer portions of the plate like wings, a plurality of frustoconical separation discs 6 are stacked. The separation discs may be made of a lightweight material such as plastic, or of metal such as stainless steel. The separation discs are each provided with distance members in order to provide separation passages 7 between the discs in the stack. The distance members are in the form of elongated protrusions extending from a radially inner portion to a radially outer portion of each separation disc, having an extension along a line or a curve. The elongated distance members, or caulks, may be straight or curved and may be integrated in the discs or attached to the discs. The distance members may alternatively or additionally comprise distance members in the form of dot-shaped caulks or microcaulks, distributed over the surface of the separation discs. On top of the stack of separation discs a top disc 29 is provided. The top disc is attached to the wings of the disc support structure. The stack of separation discs are compressed by the top disc and the bottom disc. Radially inside the separation discs a central gas space 8 is formed, divided into three parts by the wings of the disc support structure 27. The top disc is provided with a central opening 30 such that the central gas space of the rotor is open for passage of gas through the top disc. The top disc is provided with a flange 31 circumventing the central opening providing a cylindrical outer sealing surface, 18*a*.

Again turning to FIG. 1, a narrow gap is formed between a sealing surface 18*a* formed on the flange 31 of the top disc and a corresponding cylindrical sealing surface 18*b* on the first partition. The gap forms a gap sealing 18 between the first 16 and second 17 sections in the vessel. The central gas chamber 8 in the rotor communicates with a radially inner portion of the separation passages 7 and the gas outlet 4 via the central opening of the top disc and openings 32 formed in the first partition, surrounding the first bearing 13. Further, a first space 9 is formed between the inner surface of the frame 2 and radially outside and surrounding the rotor. The space 9 surrounding the rotor communicates with the radially outer portion of the separation passages 7 and a second space 41 formed by the inner surface of the frame 2 and in the axial space between the vortex generator and separation plates. Both the first space and second space are formed in the flow path between the vortex generator and separation plates. The centrifugal separator is configured such that the first and second sections of the vessel communicate via the separation passages 7 of the rotor.

The frame comprises a bottom sealing ring 33 forming the gas inlet 3 in the frame. The bottom sealing ring is sealingly connected, 38, to the inner vessel wall 25. A cylindrical frame tube 24 extends along the inner wall of the vessel as a part of the frame, from the bottom sealing ring to the first partition 15 and connects with the other parts of the frame to provide a self-supporting frame structure. The second frame portion 21 supporting the second bearing 14 is connected to and supported by the inner wall of the cylindrical frame tube. The space between the gas inlet 3 and device 10, discussed below, creates a chamber 22.

Figure 3:
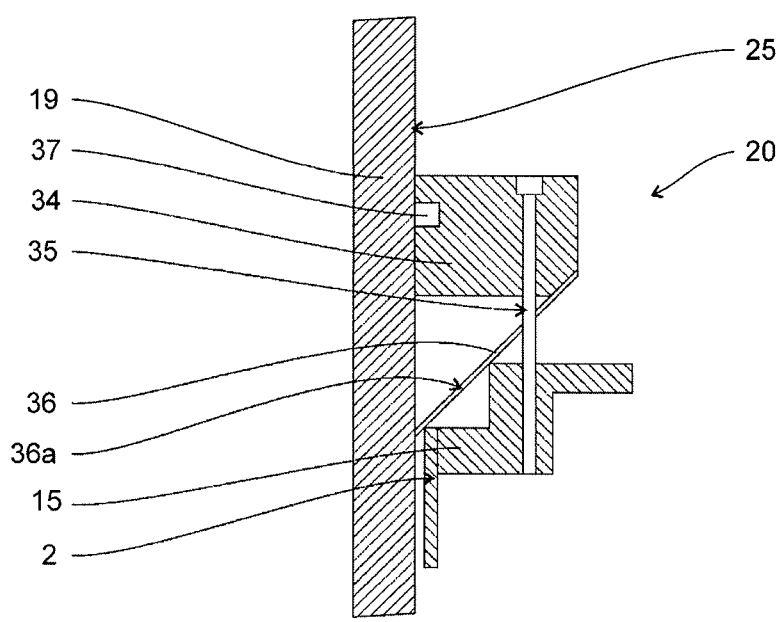
FIG. 3 shows an axial cross-section of a holding means with frustoconical slotted disc.

The frame 2 further comprises a holding means 20 to hold the frame at a position inside the vessel. The holding means comprises in a ring shaped part 34 sealingly connected, by means of a sealing member 37, to the inner vessel wall 25. The holding means is configured to engage with the cylindrical inner surface of the vessel by providing an expandable outer diameter. With reference to FIG. 3, the holding means is described in more detail. The ring shaped part 34 is connected to the first partition 15 by a plurality of bolts 35 distributed around the circumference of the ring shaped part 34. The holding means comprises one or more radially slotted frustoconical discs 36 mounted such that compression of the disc by tightening the bolts of the ring shaped part causes slotted radially outer portions 36*a* of the disc to expand and engage with the cylindrical inner surface of the vessel. Thus the expandable outer diameter is realized by a by tightening the compressive bolts 35.

Figure 4:
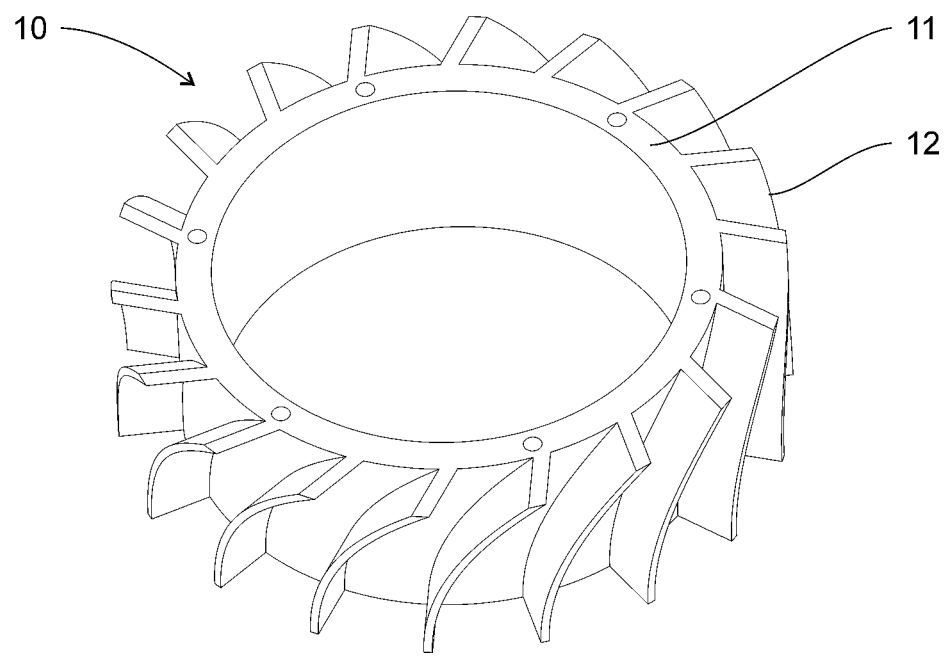
FIG. 4 shows a perspective view of a vortex generator configured to bring the gas stream in rotation.

Again with reference to FIG. 1, the centrifugal separator comprises a stationary vortex generator 10 configured to bring the gas stream in rotation. The vortex generator 10 configured to bring the gas stream in rotation is positioned upstream of the rotor and formed in the second frame portion 21. The vortex generator 10 comprises a gas deflecting member 11 comprising a plurality of vanes 12 which are inclined with respect to the axial direction x of the centrifugal rotor and distributed around the rotational axis. The vanes are arranged in a passage 11*a* formed in the second frame portion upstream of the rotor. The passage 11*a* extends radially outside the separation plates of the centrifugal rotor. With reference to FIG. 4, the vortex generator 10 configured to bring the gas stream in rotation is shown in further detail. The vortex generator 10 comprises a gas deflecting ring 11 comprising a plurality of vanes 12 extending outwardly from the gas deflecting ring and distributed around the rotational axis of the rotor. The vanes are inclined with respect to the axial direction of the rotor so that a first end of each vane is spaced from a second end of the vane in the axial and circumferential direction, which inclination is gradually increased along the length of the vanes in the direction of the flowing gas so that the vanes are curved, as seen in FIG. 4.

According to one embodiment, the vanes may be movable/or and the inclination of the vanes may be adjusted during operation in order to control the speed of rotation of the gas stream.

Figure 5:
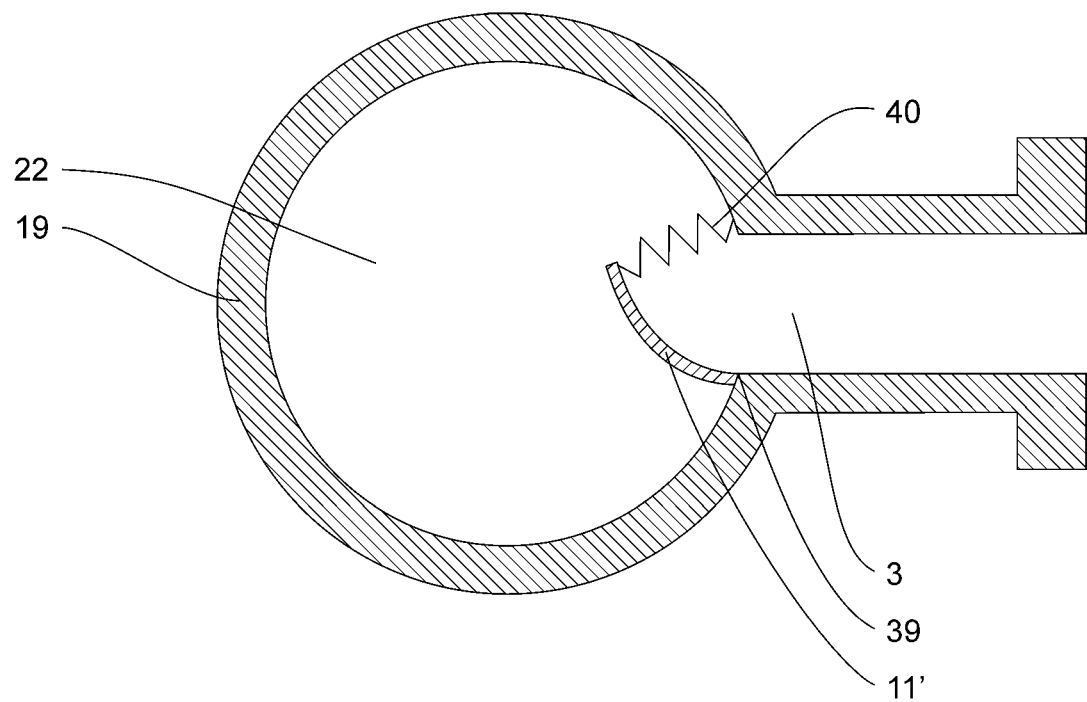
FIG. 5 shows a cross-section perpendicular to the rotational axis of a vortex generator configured to bring the gas stream in rotation according to another embodiment.

In addition to, or as an alternative to what is shown in FIG. 4, the gas inlet 3 upstream of the centrifugal rotor may be arranged at a right angle to the rotational axis of the centrifugal rotor, as shown in FIG. 5. This figure shows a cross-section of the vessel, perpendicular to the rotational axis of the rotor, at the inlet side of the centrifugal separator. It is preferred to connect external pipe connections at right angles in order to withstand high pressure in the vessel. In this embodiment, the vortex generator 10 configured to bring the gas stream in rotation upstream of the rotor comprises an inlet gas deflecting member 11' which is arranged to deflect the gas stream from the gas inlet towards a tangential direction of the centrifugal rotor. The inlet gas deflecting member 11' may be stationary or pivotally connected to the vessel 19 and may be slanted or bent such that gas flowing through the inlet 3 is deflected towards a tangential direction of the centrifugal rotor, thus achieving a rotational flow of the gas stream in the vessel. The position or inclination of the gas deflecting ring may be adjusted during operation of the separator such that to control the rotational speed of the gas stream. As shown, this may be achieved by the inlet gas deflecting member 11' being pivotally connected to the vessel at a point 39, and biased towards an initial position by means of a spring 40. The spring may be integrated with the inlet gas deflecting member at the pivot point or connecting the inlet gas deflecting member to another point of the vessel. At an increasing flow of gas the inlet gas deflecting member is deflected by the gas flow, which may result in a limitation of the speed of rotation of the gas in the vessel.

With reference to FIG. 1, the separator is mounted in the vessel 19 by placing the separator with its self-supporting frame 2 inside the vessel, at a desired position inside the vessel, and expanding the diameter of the holding means 20 so that the holding means engage with the inner surface 25 of the vessel, to hold the separator at the desired position inside the vessel.

During operation of the centrifugal separator a stream of gas enters into the inlet 3 of the centrifugal separator 1. The stream of gas is forced into the passage 11a where the inclined vanes 12 deflect the gas towards a tangential direction of the rotor of the separator. Thus the gas stream is brought into rotation by the vanes 12, and enters into the space 9 surrounding the rotor 5. In this space a pre-separation occurs whereas larger particles in the form of solid particles and/or liquid droplets having a density larger than the gas in the gas stream are separated from the gas stream by means of centrifugal forces in the rotating gas stream and deposited on the inner surface of the cylinder 24.

From the space 9 surrounding the rotor, the rotating gas stream enters into the separation passages 7 formed between the separation discs 6 in the rotor. The rotor 5 is brought into rotation by the rotating gas stream by means of viscous forces acting on the separation discs in the separation passages. The rotation of the rotor is also facilitated by the elongated distance members of the disc stack working as vanes or turbine blades to improve the transfer of momentum from the gas stream to the rotor. Since the rotating gas stream is led from the radially outer portions of the separation passages and towards the radially inner portions of the separation passages, the gas stream is spun up thanks to the conservation of angular momentum. Thus the transfer of the rotation from the gas to the rotor is particularly efficient in this configuration.

In the separation passages, particles in the form of solid particles and/or liquid droplets having a density larger than the gas in the gas stream are separated from the gas stream by centrifugal forces. Due to the smaller separation distances in the separation passages of the stack of frustoconical discs this even allows for separation of smaller and/or less dense particles from the gas stream. Particles separated from the gas stream are deposited on the inner surface of the frusto-conical separation discs and transported radially outwardly by means of centrifugal forces. From the radially outer edge of the separation discs, particles separated from the gas stream in the separation passages are thrown towards and deposited at the inner surface of the cylinder 24.

Thus the rotational flow of the gas mixture alone drives the rotation of the centrifugal rotor, without a drive motor driving the rotor. The resulting rotation causes separation of particles from the same gas stream. Cleaned gas conducted towards the central gas chamber 8 of the rotor is provided to the outlet 4 through the passages 30 and 32 formed in the rotor and the first partition, and transported from the separator through the vessel.

The invention claimed is:

1. A centrifugal separator for separation of particles from a gas stream, comprising:
   a frame, a gas inlet and a gas outlet;
   a centrifugal rotor arranged to be rotatable in the frame around a rotational axis and comprising a plurality of separation plates stacked along an axial length of the rotor and defining separation passages between the plates;
   a central gas chamber in the rotor communicating with a radially inner portion of the separation passages and the gas outlet;
   a first space surrounding the rotor and communicating with a radially outer portion of the separation passages and the gas inlet; and
   a vortex generator axially spaced from the centrifugal rotor to create a second space in an axial space between the vortex generator and the separation plates to bring the gas stream in rotation upstream of the plurality of separation plates and downstream of the gas inlet, the first space and second space defining a flow path between the vortex generator and separation plates such that the gas stream flows from the vortex generator and then radially inward toward the separation plates, and the vortex generator comprising a passage having an entrance and an exit, the exit being downstream of the entrance,
   wherein a vortex created by the vortex generator enters the first space and drives the rotation of the centrifugal rotor for separating particles from the same gas stream by being conducted from the first space surrounding the rotor, through the separation passages between the plates and towards the central gas chamber, and
   wherein the vortex generator configured to bring the gas stream in rotation is non-rotating during operation of the apparatus.

2. The centrifugal separator according to claim 1, wherein the vortex generator is configured to bring the gas stream in rotation by deflecting the gas stream towards a tangential direction of the centrifugal rotor.

3. The centrifugal separator according to claim 2, wherein the vortex generator comprises a gas deflecting ring having at least one vane inclined with respect to the axial direction of the centrifugal rotor.

4. The centrifugal separator according to claim 3, wherein the at least one vane extends radially outside the separation plates of the rotor.

5. The centrifugal separator according to claim 4, wherein there are a plurality of vanes and the inclination of the vanes with respect to the axial direction of the centrifugal rotor increases gradually along the extent of the vanes in the direction of the flow of the gas stream from the gas inlet to the gas outlet.

6. The centrifugal separator according to claim 3, wherein there are a plurality of vanes distributed around the rotational axis and the inclination of the vanes with respect to the axial direction of the centrifugal rotor increases gradually along the extent of the vanes in the direction of the flow of the gas stream from the gas inlet to the gas outlet.

7. The centrifugal separator according to claim 1, wherein the gas inlet is arranged at an angle to the rotational axis of the centrifugal rotor, wherein the angle is within the range of 70-110 degrees, and wherein the vortex generator configured to bring the gas stream in rotation upstream of the rotor comprises an inlet gas deflecting member arranged to deflect the gas stream from the gas inlet towards a tangential direction of the centrifugal rotor.

8. The centrifugal separator according to claim 1, wherein the rotor has a first and a second axial end portion, and
wherein the rotor is rotatably supported in the frame by means of a first bearing at the first axial end portion and a second bearing at the second axial end portion.

9. The centrifugal separator according to claim 1, wherein the gas inlet is arranged at an angle to the rotational axis of the centrifugal rotor, wherein the angle is within the range of 80-100 degrees, and wherein the vortex generator configured to bring the gas stream in rotation upstream of the rotor comprises an inlet gas deflecting member arranged to deflect the gas stream from the gas inlet towards a tangential direction of the centrifugal rotor.

10. The centrifugal separator according to claim 1, wherein the gas inlet is arranged at an angle of 90 degrees to the rotational axis of the centrifugal rotor, and wherein the vortex generator configured to bring the gas stream in rotation upstream of the rotor comprises an inlet gas deflecting member arranged to deflect the gas stream from the gas inlet towards a tangential direction of the centrifugal rotor.

11. The centrifugal separator according to claim 1, wherein the vortex generator extends across an entire width of the frame.

12. The centrifugal separator according to claim 1, wherein the vortex generator comprises a ring shaped gas deflecting member and a plurality of inclined vanes extending outwardly from the ring shaped gas deflecting member a first end of each vane spaced from a second end of each vane in the axial and circumferential direction.

13. The centrifugal separator according to claim 1, wherein the outlet extends along a longitudinal axis of the central gas chamber.

14. A centrifugal separator for separation of particles from a gas stream, comprising:
a frame, a gas inlet and a gas outlet;
a centrifugal rotor arranged to be rotatable in the frame around a rotational axis and comprising a plurality of separation plates defining separation passages between the plates;
a central gas chamber in the rotor communicating with a radially inner portion of the separation passages and the gas outlet;
a first space surrounding the rotor and communicating with a radially outer portion of the separation passages and the gas inlet; and
a vortex generator axially spaced from the centrifugal rotor to create a second space in an axial space between the vortex generator and the separation plates, the vortex generator configured to bring the gas stream in rotation upstream of the rotor and downstream of the gas inlet, the first space and second space defining a flow path between the vortex generator and separation plates such that the gas stream flows from the vortex generator and then radially inward toward the separation plates, and the vortex generator comprising a passage having an entrance and an exit, the exit being downstream of the entrance,
wherein a vortex created by the vortex generator enters the first space and drives the rotation of the centrifugal rotor for separating particles from the same gas stream by being conducted from the first space surrounding the rotor, through the separation passages between the plates and towards the central gas chamber,
wherein the vortex generator configured to bring the gas stream in rotation is non-rotating during operation of the apparatus,
wherein the frame is configured to be mountable inside a vessel for guiding the gas stream, and comprises a first partition for dividing the vessel into a first section upstream of the first partition and a second section downstream of the first partition,
wherein the gas inlet is in communication with the first section, the gas outlet is in communication with the second section, and
wherein the centrifugal separator is configured such that the first and second sections communicate via the separation passages of the rotor.

15. The centrifugal separator according to claim 14, wherein a seal is provided between the first partition and the centrifugal rotor.

16. The centrifugal separator according to claim 14, wherein the frame is a self-supporting frame for mounting inside an existing vessel for guiding the gas stream, and wherein the frame comprises a holder to hold the frame at a position inside the vessel.

17. The centrifugal separator according to claim 14, wherein the frame comprises a passage upstream of the rotor, and
wherein the vortex generator configured to bring the gas stream in rotation is arranged in the passage.

18. A method of separating particles from a gas stream, the method comprising the steps of:
providing a centrifugal rotor arranged to be rotatable around a rotational axis and comprising a plurality of separation plates stacked along an axial length of the rotor and defining separation passages between the plates, a central gas chamber in the rotor communicating with a radially inner portion of the separation passages and a gas outlet, and a first space surrounding the rotor and communicating with a radially outer portion of the separation passages and a gas inlet;
deflecting a gas stream by bringing a gas stream moving in an axial direction in rotation upstream of the plurality of separation plates and downstream of the gas inlet with a vortex generator spaced from the centrifugal rotor to create a second space between the vortex generator and the separation plates;
creating a vortex in the first space;
rotating the rotor by the rotational flow of the gas stream contacting the plurality of separation plates for separating particles from the gas stream by conducted the vortex radially inwardly from the first space surrounding the rotor, through the separation passages between the plates and towards the central gas chamber.

* * * * *